(12) United States Patent
Weibler et al.

(10) Patent No.: US 12,151,423 B2
(45) Date of Patent: Nov. 26, 2024

(54) MOLDING TOOL AND MOLDING METHOD FOR PRODUCING CONTAINERS WITH UNDERCUTS

(71) Applicant: Marbach Werkzeugbau GmbH, Heilbronn (DE)

(72) Inventors: Klaus Weibler, Bretzfeld-Bitzfeld (DE); Matthias Frank, Nordheim (DE); Andreas Haefner, Heilbronn (DE)

(73) Assignee: Marbach Werkzeugbau GmbH, Heilbronn (DE)

( * ) Notice: Subject to any disclaimer, the term of this patent is extended or adjusted under 35 U.S.C. 154(b) by 374 days.

(21) Appl. No.: 17/597,963

(22) PCT Filed: Jul. 8, 2021

(86) PCT No.: PCT/EP2021/069026
§ 371 (c)(1),
(2) Date: Jan. 31, 2022

(87) PCT Pub. No.: WO2022/008672
PCT Pub. Date: Jan. 13, 2022

(65) Prior Publication Data
US 2022/0314523 A1  Oct. 6, 2022

(30) Foreign Application Priority Data

Jul. 10, 2020 (DE) ...................... 10 2020 118 217.1

(51) Int. Cl.
*B29C 51/34* (2006.01)
*B29C 51/10* (2006.01)
(Continued)

(52) U.S. Cl.
CPC .............. *B29C 51/34* (2013.01); *B29C 51/10* (2013.01); *B29C 51/44* (2013.01);
(Continued)

(58) Field of Classification Search
None
See application file for complete search history.

(56) References Cited

U.S. PATENT DOCUMENTS 3,341,893 A   9/1967  Edwards
3,418,690 A  12/1968  Edwards
(Continued)

FOREIGN PATENT DOCUMENTS

DE   1479334 A    2/1969
DE   3420551 A1   8/1985
(Continued)

OTHER PUBLICATIONS

Office Action dated Sep. 19, 2023 in German Patent Application No. 10 2020 118 217.1.
(Continued)

*Primary Examiner* — Yung-Sheng M Tsui
(74) *Attorney, Agent, or Firm* — Riley Intellectual Propery Law, LLC

(57) ABSTRACT

A molding tool (1000), in particular a thermoforming tool, for producing a container (10) is provided. The molding tool comprises a mold bottom (200) and a mold insert (100) receiving the mold bottom (200), wherein the mold insert (100) is constructed of at least two mold insert parts (110, 120) that together with the mold bottom (200) define a cavity (300) provided for reshaping a two-dimensional web of material into a container, wherein a first mold insert part (110) is mounted stationary in the molding tool (1000) and a second mold insert part is axially movable in the molding tool (1000).

17 Claims, 4 Drawing Sheets

(51) Int. Cl.
*B29C 51/44* (2006.01)
*B29L 31/00* (2006.01)

(52) U.S. Cl.
CPC .. *B29C 2791/006* (2013.01); *B29C 2791/007* (2013.01); *B29L 2031/712* (2013.01)

(56) References Cited

U.S. PATENT DOCUMENTS

| | | |
|---|---|---|
| 4,609,339 A | 9/1986 | Padovani |
| 7,140,863 B2 | 11/2006 | Koppenhöfer |
| 2002/0027308 A1* | 3/2002 | Koppenhofer ........ B29C 51/343 425/398 |
| 2007/0252307 A1 | 11/2007 | Borst |
| 2017/0320257 A1* | 11/2017 | Van Tilborgh .......... B29C 51/32 |

FOREIGN PATENT DOCUMENTS

| | | |
|---|---|---|
| DE | 102016103237 A1 | 8/2017 |
| EP | 1361036 A1 | 11/2003 |
| EP | 1163996 B1 | 10/2004 |
| EP | 1541320 A1 | 6/2005 |

OTHER PUBLICATIONS

International Search Report and Written Opinion from PCT/EP2021/069026 (with English translation of pp. 8-13).
Office Action dated Jan. 13, 2021 in priority German patent application No. 10 2020 118 217.1 (with English translation of pp. 4-6).

* cited by examiner

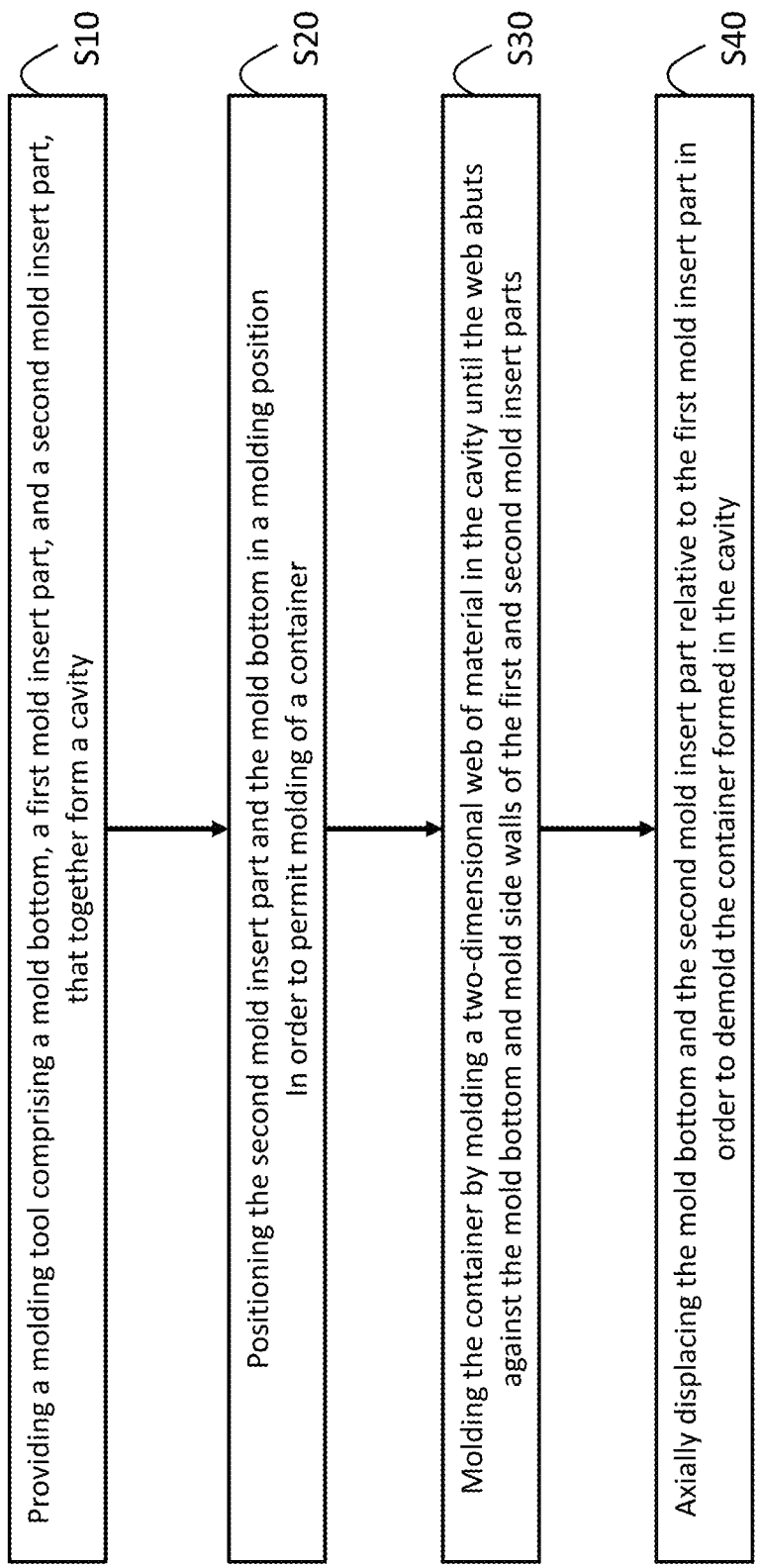

MOLDING TOOL AND MOLDING METHOD FOR PRODUCING CONTAINERS WITH UNDERCUTS

TECHNICAL FIELD

The invention relates to a molding tool, in particular a thermoforming tool, to a use of such a molding tool, and to a method for producing containers from a two-dimensional web of material.

PRIOR ART

Molding and shaping tools are known from the prior art that are embodied for reshaping two-dimensional (planar) sheets or webs of material into three-dimensional containers, such as, for example, cups, bowls, or capsules. Such articles are employed in the foodstuffs industry for packing foodstuffs, for instance. The containers may be produced from plastic material or a different material, such as, for example, sheet or cellulose.

Thermoforming is frequently used for producing plastic containers. Thermoforming methods and thermoforming tools for producing plastic containers are described, for example, in EP 1 541 320 A1, EP 1 163 996 B1 and DE 10 2016 103 237 A1. Such thermoforming tools comprise an upper tool part and a lower tool part that are arranged coaxially with one another and are movable along the common axis. The upper tool part has at least one hold-down device and a pre-stretcher mounted displaceable therein. The lower tool part has a molding device having at least one mold insert and one mold bottom. EP 1 163 996 B1 teaches a two-part axially displaceable mold bottom for molding a container with a hollow base. Regardless of the specific configuration of the mold bottom, mold insert and mold bottom are embodied and arranged such that together they form with a cavity (hollow space) with mold side wall and mold bottom which reproduce the shape of the container to be molded.

During a thermoforming process, first a thermoplastic film is heated and arranged between the upper mold part and the lower mold part. The two mold parts are then closed (i.e., moved to one another). The heated plastic film is pressed into the cavity, and thus pre-formed, using the pre-stretcher. For complete molding, compressed air (also called molding air) is introduced into the cavity and/or a negative pressure (vacuum) is produced in the cavity. This presses the pre-molded film further against the mold side wall (formed by the inner wall of the mold insert) and the mold bottom. The plastic film thus completely molded is then cooled, so that a container with rigid walls is created. The container is then released (demolded) from the mold side wall and mold bottom. This demolding may be mechanical, for example using a slight lifting of the mold bottom into the cavity (that is, lifting of the mold bottom counter to the direction of the mold). The lift movement generally causes the container to release completely from the mold side wall. Then further lifting of the mold bottom can remove (eject) the container from the cavity.

Compared to other manufacturing techniques, such as, for example, injection molding methods, thermoforming tools and thermoforming methods have the advantage that as a rule the tools can be equipped with a number of mold inserts arranged adjacent to one another. Thus, a plurality of containers can be produced in one molding cycle. In addition, the molding cycle times are short, so that a higher throughput of containers can be attained. However, it is a drawback that thermoforming tools and thermoforming methods are only suitable for producing containers with undercuts under certain conditions. For example, it is difficult to reliably produce containers with undercuts running continuously in the circumferential direction of the container. Such undercuts may be desirable, for one example, in the vicinity of the container opening or container bottom for the purpose of stacking containers, and, for another example, for enhancing cup stability. If the undercuts are too large or are too prominent, it is difficult to demold the containers without destroying them in the process.

Known from DE 3 420 551 C2 is a molding tool for producing stackable containers from a plastic film that has undercuts embodied in the circumferential direction of the container. The mold tool has a substantially truncated conical cavity. The latter is defined by a mold bottom, coupled to an ejector unit, and a mold insert, the inner surface of which forms the mold side wall. On its axial end facing the mold bottom the mold insert has a plurality of projections arranged spaced apart from one another in the circumferential direction that project radially into the cavity. Using these projections it is possible to produce containers with undercuts embodied locally in the circumferential direction. The projections are radially movable using a pusher and eccentric device (see in particular FIG. 3 of DE 3 420 551 C2) and can be moved radially outward from the cavity in order to make it possible to demold the container. The reshaping tool described in DE 3 420 551 C2 with eccentric and pusher technology is complex to realize, however, and this technology requires a large installation space. In addition, it is not possible to produce containers with continuous circumferential undercuts.

It is therefore the object of the present invention to provide a technique that overcomes the disadvantages described in the foregoing. In particular, it is the object of the present invention to provide a molding tool and molding method that make it possible to produce containers with undercuts, in particular continuous undercuts running in the circumferential direction.

Short Summary

To attain the aforesaid object, according to a first aspect a molding tool, in particular a thermoforming tool, is provided for producing a container. The molding tool comprises a mold bottom and a mold insert receiving the mold bottom, wherein the mold insert is constructed of at least two mold insert parts that together with the mold bottom define (or delimit) a cavity provided for reshaping a two-dimensional web of material into a container. A first mold insert part of the at least two mold insert parts is mounted stationary in the molding tool and a second mold insert part is mounted axially movable (displaceable) in the molding tool.

The cavity is embodied in the interior of the mold insert. For forming the cavity, the mold insert has a mold inner wall that extends in the axial direction of the mold insert and that forms one mold side wall of the cavity. According to one implementation, the mold insert can be embodied as a mold sleeve having a mold inner wall extending axially. The mold bottom is arranged at one axial end of the mold insert (or the mold sleeve) or is received by the same. Depending on the configuration of the molding tool, the mold insert can be received in a lower tool part or upper tool part of the molding tool.

The cavity is a hollow space that is delimited axially and radially by the mold insert or the mold inner wall thereof and by the mold bottom. The shape of the mold bottom surface and of the mold side wall defines the shape of the cavity and thus also the shape of the container to be produced.

"Two-dimensional web of material" can refer to a film made of plastic (referred to briefly as plastic film in the following) or some other material film or material layer that is designed to be converted to a three-dimensional shape using the effects of external forces (mechanical, using of a pre-stretcher, and/or pneumatically by applying compressed air and/or a vacuum). In particular a thermoplastic film can be used during production of the container.

"Mounted stationary" means that the first mold insert part (or the first mold sleeve part) is mounted immovable in the molding tool. In other words, the first mold insert part can be moved neither axially nor radially.

The first mold insert part and the second mold insert part can be arranged coaxially along a common axis. The common axis may be a rotational axis of the hollow space formed by the mold insert and the first and second mold insert parts.

The second mold insert part (or the second mold sleeve part) can be mounted axially moveable with respect to the first mold insert part (that is, along the common axis) such that the second mold insert part is selectively movable back and forth between a molding position and a demolding position. "Molding position" refers to that position of the movably mounted second mold insert part the second mold insert part that assumes during the production (molding) of a container. In the molding position, the second mold insert part can transition (essentially) seamlessly into the second mold insert part. In other words, in the molding position the first mold insert part and the second mold insert part are positioned relative to one another such that they (essentially) transition seamlessly into one another and thus form one uniform cavity.

"Demolding position" refers to the position of the movably mounted second mold insert part that the second mold insert part assumes during demolding. In the demolding position, the second mold insert part can be axially displaced with respect to the first mold insert part by a predetermined amount. In other words, in the demolding position the second mold insert part can be arranged spaced axially apart from the first mold insert part by a predetermined amount. The axial displacement of the second mold insert part relative to the first mold insert part can facilitate the demolding of a container. This is especially true if the first mold insert part has moldings embodied for producing undercuts in the container.

The first mold insert part can have a first mold side wall and the second mold insert part can have a second mold side wall. The two mold side walls can be embodied and configured relative to one another such that in the molding position they (essentially) merge seamlessly with one another. Thus in the molding position a cavity having a uniform mold side wall is created.

During the transition from the molding position to the demolding position, the second mold side wall can be displaced axially relative to the first mold side wall by a predetermined amount. Demolding of the container along its side wall can be (actively) facilitated using the axial displacement of the second mold wall relative to the first mold side wall. This is in particular advantageous when undercuts are embodied along the container side wall.

The first mold insert part and/or the second mold insert part can have an undercut extending circumferentially. The undercut can be realized on the specific mold side walls in the form of a continuous circumferential bulge in the wall.

According to one implementation, the second mold insert part can furthermore be embodied rounded outward at its axial end facing away from the first mold insert part. The rounding can produce a circumferential undercut in the region of the sealing edge or the opening of the container. In particular, this rounding and the axial displacement of the second mold insert segment can facilitate the demolding of the container in the region of the undercut.

The mold bottom can be received axially movable (displaceable) in the first mold insert part at an end facing away from the second mold insert part. The mold bottom can be mounted in the molding tool such that it, together with the second mold insert part, can be moved back and forth between the demolding position and the molding position. The mold bottom mounted axially movable and the second mold insert part can be moved back and forth synchronously (simultaneously) between the molding position and the demolding position. In this way it is possible to demold the container uniformly and gently in the vicinity of the container bottom and along the container side wall. This is particularly advantageous for containers with high container side walls and undercuts realized therein. In this manner it is possible to concentrate the demolding forces occurring due to the demolding movement not only on the container bottom, but also to distribute them more evenly across the container, so that the risk of the container being crushed (buckling) due to the demolding forces occurring is sharply reduced.

As an alternative to the synchronous movement described in the foregoing, an asynchronous (that is, non-simultaneous) axial movement of mold bottom and second mold insert part between the molding position and the demolding position is also possible. In other words, the mold bottom and the second mold insert part can be moved axially relative to one another in an asynchronous manner. For example, the mold bottom and the second mold insert part can be moved axially relative to one another such that in its axial demolding movement the second mold insert part runs ahead of or trails the mold bottom temporally (for example by a predetermined amount of time). The second mold insert part running ahead temporally can be attained, for instance, in that the second mold insert part is caused to move (is actuated) earlier than the mold bottom by a predetermined amount of time. The second mold insert part trailing temporally can be attained, for instance, in that the mold insert part is caused to move (is actuated) in a time-delayed manner after a predetermined amount of time. It is also possible for the mold bottom and the second mold insert part to be moved at different speeds, so that the second mold insert part either runs ahead of or trails the mold bottom due to the different in speed between the mold bottom and the second insert part. The amount of time or difference in speed can be selected as a function of the dimensions or geometry of the container to be demolded such that it is possible to demold the container gently and optimally in the vicinity of the container bottom and along the container side wall.

According to one implementation, the molding tool can further comprise an actuating device provided for selectively moving (displacing) the second mold insert part axially between the molding position and the demolding position. The actuating device may be embodied to displace the second mold insert part back and forth between the molding position and the demolding position. According to one variant, the actuating device can be a pneumatic or hydraulic actuating device. Furthermore, in accordance with one implementation the mold bottom can be coupled to the actuating device so that when the second mold insert part is actuated the mold bottom is moved synchronously (in the axial direction). In accordance with one alternative implementation, the actuating device can be embodied to actuate the mold bottom such that the mold bottom moves axially in a manner asynchronous to the second mold insert part. In both implementations (that is, synchronous and asynchronous movement of the mold bottom and second mold insert part), the actuating device can be embodied to move the second mold insert part and the mold bottom in the same axial direction (for example, counter to the mold direction) during demolding of the container. "Mold direction" is the direction within the molding tool that is defined by the intentional reshaping process of the two-dimensional web of material into a three-dimensional container using a pre-stretcher and/or compressed air.

The mold bottom may furthermore be coupled to an ejecting device. The ejecting device can be embodied to move the mold bottom further in the direction of the cavity (that is, counter to the mold direction towards the ejection position) after the container has been demolded in order to eject the container.

The ejecting device can furthermore be embodied to return the mold bottom to its starting position (molding position). Using the return movement of the mold bottom, the latter can move the second mold insert part from its demolding position to the molding position if the second mold insert part is coupled to the mold bottom via the actuating device.

The mold insert and the mold bottom movably received in the first mold insert part can be parts of a lower tool part of the molding tool. Furthermore, the molding tool can have an upper tool part that cooperates with the lower tool part. The upper tool part can furthermore have a hold-down device and a pre-stretcher movably mounted in the hold-down device. The pre-stretcher can be embodied for pre-stretching the film to be reshaped in the direction of the cavity. Using the pre-stretching process, the film is reshaped into a blank having a temporary intermediate shape that is not yet shape of the container provided by the mold insert and mold base. By applying compressed air and/or a vacuum, the blank can be further reshaped into the final container shape in that the pre-stretched web of material is moved against the bottom surface and the mold side wall of the mold insert by means of compressed air and/or the vacuum.

In accordance with one further aspect, a molding machine, in particular a thermoforming machine, is provided and comprises the molding tool described herein. The thermoforming machine can comprise a molding station in which the molding tool is installed.

In accordance with one further aspect, use of the molding tool described herein for producing a container from a two-dimensional web of material, in particular from a thermoplastic film, is provided.

In accordance with one further aspect, a method for producing a container from a two-dimensional web of material is provided, wherein the method comprises the following steps: providing a molding tool, wherein the molding tool comprises a mold bottom, a first mold insert part, and a second mold insert part which form a cavity having a mold side wall; positioning the second mold insert part and the mold bottom of the molding tool in a molding position in order to permit molding of the container; molding the container, in that a two-dimensional web of material is molded in (thermoformed) until it is positioned against the mold bottom and mold side wall of the mold insert; and, axially moving (displacing) the mold bottom and the second mold insert part relative to the first mold insert part in order to demold the container molded in the cavity.

The provided molding tool can be a molding tool or a combined molding and punching tool, as described above. In particular the mold bottom and the second mold insert part can be axially moved (displaced) axially by a predetermined amount, synchronously or asynchronously, in order to demold the container. The synchronous or asynchronous movement (displacement) can be attained using a common (pneumatic or hydraulic) actuating device or using two separate (pneumatic or hydraulic) actuating devices. Mold bottom and second mold insert part can be moved axially in the same direction during demolding. The axial demolding movement by mold bottom and second mold insert part preferably opposes the mold direction of the container to be molded.

After the demolding position is attained, the mold bottom can be moved further towards the cavity in order to eject the demolded container. This ejection movement can be realized using a further actuating device, such as, for example, an ejecting device.

BRIEF DESCRIPTION OF THE DRAWINGS

Further details and advantages of the invention are explained in greater detail using the following drawings.

DETAILED DESCRIPTION

Figure 1:
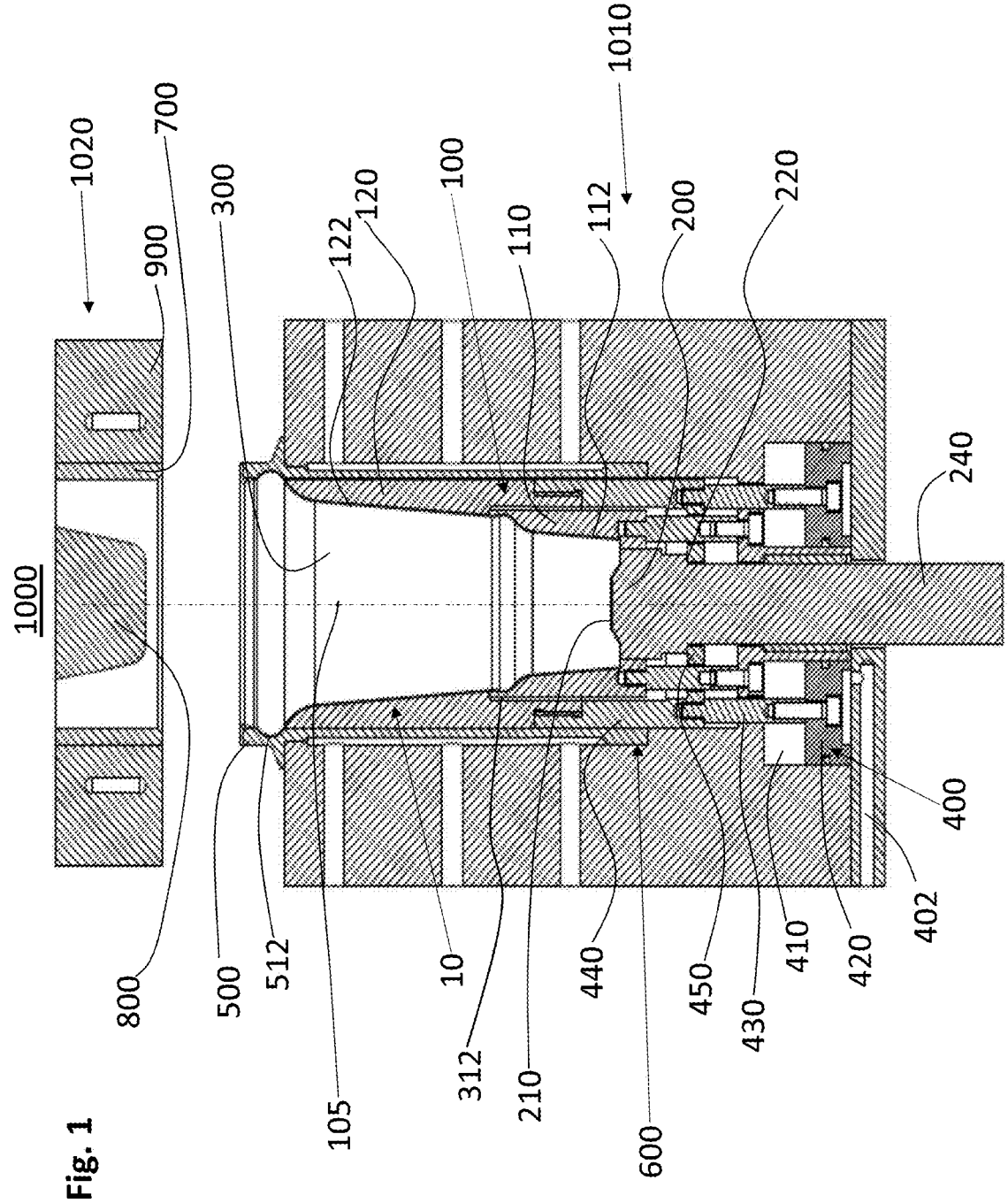
FIG. 1 is a sectional view of an exemplary molding tool according to the present invention following molding of a container.
Figure 2:
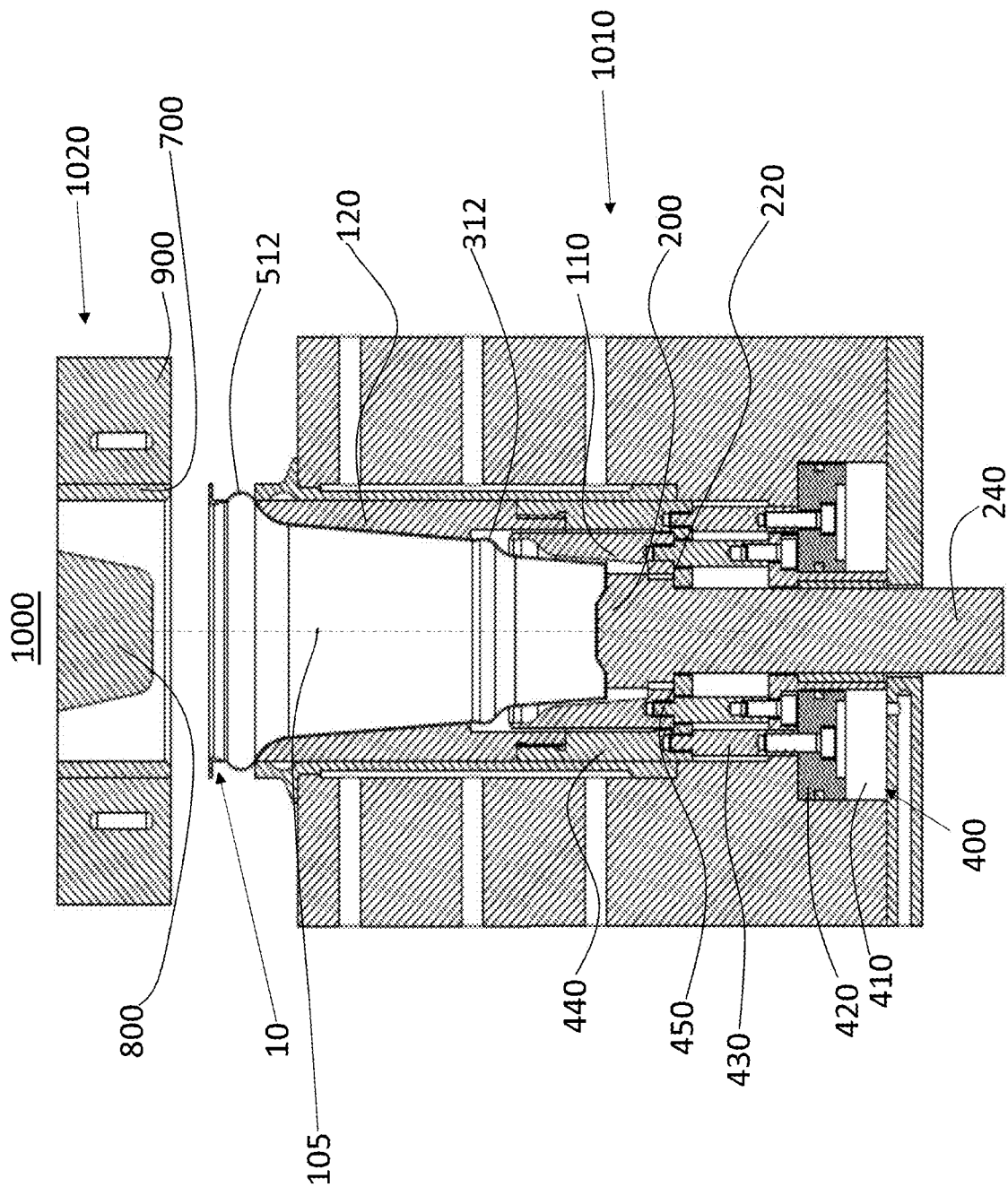
FIG. 2 is a sectional view of the molding tool according to FIG. 1 during container demolding.
Figure 3:
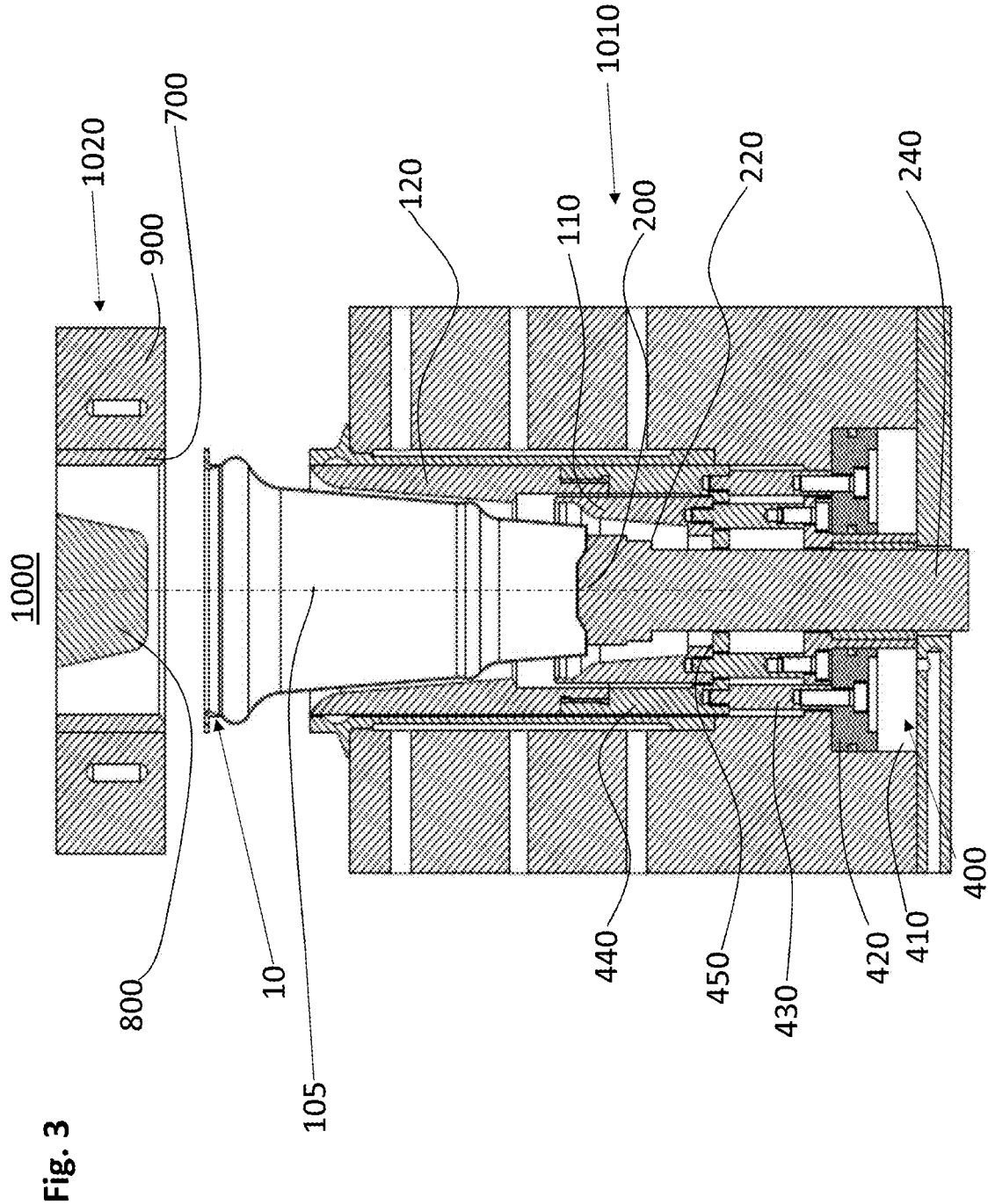
FIG. 3 is a further sectional view of the molding tool according to FIG. 1 during ejection of the container; and, FIG. 4 is a flow chart describing a method for producing a container with a molding tool as described in connection with FIGS. 1 through 3.

In relation to FIGS. 1 through 3, an inventive molding tool for producing (molding) a container 10 shall be further described now. The molding tool 1000 is realized as a thermoforming tool and can be installed in a thermoforming machine, or, more precisely, in a molding and punching station of a thermoforming machine.

The molding tool 1000 shall now be described in greater detail in relation to FIG. 1. The molding tool 1000 comprises a mold insert 100. In the present implementation, the mold insert 100 is embodied in two parts and comprises a first mold insert part 110 and a second mold insert part 120. The first mold insert part 110 is embodied like a sleeve and has a first inner wall forming a first mold side wall 112. The second mold insert part 120 is also embodied like a sleeve and has second inner wall forming a second mold side wall 122. The molding tool 1000 further comprises a mold bottom 200 which, as shall be described in greater detail below, is movably received in the mold insert 100, more precisely in the first mold insert part 110.

The mold bottom 200, together with the first mold insert part 110 and the second mold insert part 120, forms a hollow space that functions as the cavity 300. More precisely, the first mold side wall 112, second mold side wall 122, and interior mold bottom wall 210 define the cavity 300 into which a web of material can be molded in order to mold a three-dimensional container 10. A thermoplastic film that is heated prior to the reshaping process can be used as the web of material.

The first mold insert part 110 and the second mold insert part 120 are arranged coaxially along a common axis 105. The common axis 105 is suggested in FIG. 1 and corresponds to the rotational axis of the cavity 300 formed by the first mold insert part 110 and the second mold insert part 120. It is essential to the invention that the second mold insert part 120 is movably mounted in the molding tool 1000 and can be moved back and forth axially (that is, along the axis 105). In contrast, the first mold insert part 110 is mounted stationary in the molding tool 1000 and does not move.

In FIG. 1 of the illustrated implementation, the molding tool 1000 furthermore has a blanking punch 500 that continues the cavity 300 at the axial end opposing the mold bottom 200 (axial upper end) of the second mold insert part 120. The blanking punch 500 is embodied like a sleeve. On its inner wall it has a bulge 512 that runs circumferentially and, together with the outwardly curved mold side wall, forms an undercut on the upper axial end of the second mold insert part 120. It is obvious that the embodiment of the blanking punch 500 described in connection with FIG. 1 is not essential for the invention and can also be embodied differently in other molding tools.

The molding tool 1000 further comprises an actuating device 400 coupled to the second mold insert segment 120. The actuating device 400 is embodied to move the second mold insert part 120 back and forth between a molding position and a demolding position, as shall be described in detail below. The actuating device 400 is pneumatic in accordance with the implementation illustrated in FIG. 1. It comprises a cylinder-piston device having a piston 420 received in an axially movable manner in a cylinder 410, wherein the piston 420 can be moved by introducing compressed air into the cylinder 410. To this end, the cylinder-piston device is connected to a compressed air circuit (merely suggested in FIG. 1 by line 402) that supplies compressed air to and removes compressed air from the cylinder 420 as needed. The compressed air circuit can be pneumatically coupled to a compressed air source arranged outside of the molding tool 1000. To facilitate the resetting of the piston 420 in the cylinder 410 after the compressed air has been removed, the actuating device 400 can furthermore have a spring device that is mounted in the axial direction of movement of the piston 420 between the piston 420 and the inner wall of the cylinder 410 arranged opposing the piston 420 (not shown in FIG. 1). When the piston 420 is moved by means of the supplied compressed air, further spring force opposing the pressure force on the piston 420 builds up on the spring. This spring force is able to move the piston 420 to its starting position as soon as the pressure in the cylinder 410 (cylinder chamber) is reduced.

The actuating device 400 further comprises a transmission element 430 that is mechanically connected at one end to the piston 420 and at the other end to a bearing device 440.

The bearing device 440 is embodied for movably bearing the second mold insert segment 120. At its first end (lowermost end in FIG. 1), the bearing device 440 is coupled to the piston 420 and at its axially opposing second end receives the second mold insert part 120.

As can further be seen from FIG. 1, the bearing device 440 is embodied in a sleeve-like manner. The bearing sleeve 440 surrounds the first mold insert part 110, which is mounted in a stationary manner, and the mold bottom 200. When the bearing sleeve 440 is actuated, the latter moves axially along the outer wall of the first mold insert part 110 arranged in a stationary manner. This design realizes a particularly compact actuating mechanism that does not require much installation space.

As can further be seen from FIG. 1, at its lower end the bearing device 440 has a driver element 450. The driver element 450 is arranged below the first mold insert part 110 and projects radially (that is, perpendicular to the axial direction) inward such that it comes into contact with the back side of the mold bottom 200. At its back side facing away from the cavity 300, the mold bottom 200 has, at the transition to an ejector unit 240, a(n annular) shoulder 220 with which the mold bottom 200 is positioned against the driver element 450. This makes it possible, when the cylinder-piston device 410, 420 is actuated, to move (that is, to lift) the mold bottom 200 and the second mold insert part 120 together (and synchronously) axially upward. This demolding movement by simultaneously lifting the mold bottom 200 and the second mold insert part 120 is described in greater detail below in connection with FIG. 2.

On the other hand, using the design of the bearing device 440 with bottom driver element 450, it is possible to further control the demolding movement, in particular the beginning of the demolding movement of mold bottom 200 and second mold insert part 120 using the mold bottom 200 or using the ejector unit 240 coupled to the mold bottom 200. For instance, it is possible to block, by means of the ejector unit 240, the axial demolding movement of the mold bottom 200 and the axial demolding movement of the second mold insert part 120 (the latter is coupled via the bearing device 440 and the driver element 450 to the mold bottom 200) until a predetermined threshold pressure has built up in the actuating device 400. The demolding movement is not triggered until the predetermined threshold pressure has been attained in the cylinder-piston device 410, 420. The beginning of the demolding movement can be controlled using the blocking mechanism described herein. In particular, it can be assured that, in a molding tool having a plurality of mold inserts arranged in parallel, the demolding movement for each mold insert is only initiated when the same threshold pressure has been attained and thus is initiated essentially simultaneously.

As can further be seen from FIG. 1, the molding tool 1000 has a lower molding tool part 1010 and an upper molding tool part 1020. The previously described mold insert parts 110, 120, sleeve-like bearing device 440, and blanking punch 500 are received in a recess (bore 600) of the lower molding tool part 1010. The actuating device 400 is arranged axially below the two mold insert parts 110, 120. The design described herein is space saving and has a limited horizontal expansion, so that it is possible to install a large number of mold inserts adjacent to one another in one tool.

The upper molding tool part 1020 has a cutting plate 900 cooperating with the blanking punch 500 as well as a hold-down device 700. The upper molding tool part 1020 further comprises a pre-stretcher 800 that is mounted axially movable with respect to the hold-down device 700 and can be moved into the cavity 300. In this way, a web of material, especially a thermoplastic film, arranged between the lower molding tool part 1010 and the upper molding tool part 1020, can be pressed into the cavity 300 and thus preformed. This process is not illustrated in FIG. 1. On the contrary, FIG. 1 illustrates the container 10 already formed after the end of the molding process, wherein the upper molding tool part 1020 is moved away from the lower molding tool part 1010, and the pre-stretcher 800 is disposed in its retracted position. Alternatively, it is possible for the molding tool

1000 not to have any pre-stretcher 800 and for the thermoplastic film to be molded into the cavity 300 by means of compressed air or a vacuum.

In the configuration illustrated in FIG. 1, the movably mounted mold bottom 200 and the second mold insert part 120 are disposed in a molding position (i.e., in a starting position) in which the container 10 is molded. In this molding position, the mold bottom 200 is disposed at the end of the first mold insert part 110 axially opposing the second mold insert part 120. It delimits the cavity 300 at its lower axial end. Furthermore, the second mold insert part 120 is positioned axially relative to the first mold insert part 110 such that the mold side wall 112 of the first mold insert part 110 transitions essentially seamlessly into the mold wall side 122 of the second mold insert part 120. The two mold insert parts 110, 120 thus form one cavity 300 having an axially continuous mold side wall. In the exemplary embodiment illustrated in FIG. 1, along its side wall the cavity 300 has two continuously embodied undercuts running in the circumferential direction the cavity 300. A first undercut 312 is embodied at the upper end of the first mold side wall 112. A second undercut 512 is embodied at the transition between the second mold side wall 122 and the blanking punch 500. Consequently, the produced container 10 has two undercuts that are embodied continuous in the circumferential direction of the container 10, wherein a first undercut is embodied in the vicinity of the container opening and a second undercut in the vicinity of the container bottom.

The demolding of the molded container 10 having two undercuts 312, 512 running circumferentially is explained in connection with FIG. 2. FIG. 2 illustrates a side elevation of the molding tool 1000 illustrated in FIG. 1 during demolding of the container 10. The only difference between the side elevations in FIG. 1 and FIG. 2 is that the bearing device 440 has been upwardly axially displaced (by a predetermined amount) by actuation of the cylinder-piston device 410, 420 coupled thereto. This displacement of the bearing device 440 causes an axial displacement (lifting movement) of the second mold insert part 120 and of the bottom 200 relative to the first mold insert part 110, which is mounted stationary. This axial displacement causes the container 10 molded in the cavity 300 to be uniformly demolded from the mold side wall of the lower and the upper mold insert segments 110, 120. This is because the upward axial movement of the second mold insert part 120 facilitates demolding of the container 10 in the upper region, in particular in the region of the upper undercut 512. In particular the rounding at the axial upper end of the moveably mounted second mold insert 120 means that, during the lifting movement of the second mold insert part 122, the container wall is pressed slightly inward at the first undercut 512, so that demolding of the container 10 is facilitated in this region. Demolding in the lower container region having the second undercut 312 is facilitated by the bottom lifting.

According to one further development, the demolding movement of the second mold insert part 120 and mold bottom 200 initiated by actuating the cylinder-piston device 410, 420 described in the foregoing can be further controlled in that the demolding movement does not start until a predetermined threshold pressure has been attained in the cylinder 410. This control can be realized, for example, using the ejector unit 240, which can be triggered such that it blocks the demolding movement of the mold bottom 200 and the second mold insert part 120 coupled to the mold bottom 200 via the bearing device 440 until a predetermined actuating pressure (threshold pressure) has built up in the cylinder-piston device.

The ejection of the demolded container 10 is further illustrated in connection with FIG. 3. Once the mold bottom 200 and the second mold insert part 122 have assumed the demolding position for demolding the container 10 (see FIG. 2), the mold bottom 120 is lifted further using the ejector unit 240. The container 10 can be ejected from the cavity unit 300 using this further lifting movement of the mold bottom 200. After the container is ejected, the mold bottom 200 is returned to the molding position (starting position) using the ejector unit. Due to the downward movement of the mold bottom 200 (that is, back to the molding position), the mold bottom 200 comes back into contact with the driver element 450 of the bearing device 440, so that the bearing device 440 and thus the second mold insert part 120 are moved to the molding position (starting position->see FIG. 1).

Now, as explained in connection with FIGS. 1 through 3, a method for producing a container using a molding tool 1000 shall be further described in connection with FIG. 4.

In a first step S10, the method comprises providing a molding tool. This molding tool comprises a mold bottom, a first mold insert part, and a second mold insert part that together form a cavity. The cavity is defined by a mold side wall formed by the first mold insert part and second mold insert part. As already described in connection with FIGS. 1 through 3, the mold bottom and the second mold insert part are mounted moveable relative to the first mold insert part.

In a second step S20, the second mold insert part and the mold bottom are positioned in a molding position that makes it possible to mold the container. In this molding position, the mold bottom is arranged in a lower axial end of the first mold insert part. It delimits the cavity 300 axially. Furthermore, the first mold insert part and the second mold insert part are arranged relative to one another in the molding position such that a first mold side wall of the first mold insert part transitions essentially seamlessly into a second mold side wall of the second mold insert part, and thus a uniform mold side wall is formed.

In a further step S30, the container is molded in that a two-dimensional web of material (for example, a thermoplastic film) is molded into the cavity (thermoformed) until the web of material is positioned against the mold bottom and the mold side walls of the first and second mold insert part. Thus a container is created that assumes the shape of the cavity, in particular of the mold bottom and mold side walls.

In a subsequent further step S40, the molded container is demolded from the mold side walls and mold bottom. This occurs due to axial displacement of the mold bottom and of the second mold insert part counter to the thermomolding direction. The first mold insert part is not moved during this.

The holding tool and molding method described herein have the advantage that containers with high side walls and undercuts can be reliably and safely demolded. According to the present invention, container demolding is initiated and facilitated by the movement of the mold bottom and second mold insert part relative to the first mold insert part.

What is claimed is:

1. A thermoforming tool for producing a container, the thermoforming tool comprising:
    a mold bottom and a mold receiving the mold bottom,
    wherein the mold insert is construction of at least first and second mold insert parts that together with the mold bottom define a cavity provided for reshaping a two-dimensional web of material into a container,
    wherein the first mold insert part is mounted stationary in the thermoforming tool and the second mold insert part is mounted axially movable in the thermoforming tool, wherein the mold bottom is received in an axially movable manner at an end of the first mold insert part facing away from the second mold insert part, and wherein the mold bottom and the second mold insert part are mounted in the thermoforming tool such that they can be moved back and forth axially between a molding position and a demolding position.

2. The thermoforming tool according to claim 1, wherein the second mold insert part is mounted axially displaceable with respect to the first mold insert part such that the second mold insert part is selectively moveable back and forth between a molding position and a demolding position.

3. The thermoforming tool according to claim 2, wherein in the molding position the second mold insert transitions essentially seamlessly into the second mold insert part.

4. The thermoforming tool according to claim 2, wherein in the demolding position the second mold insert part is axially displaced by a predetermined amount relative to the first mold insert part.

5. The thermoforming tool according to claim 1, wherein the first mold insert part has a first mold side wall and the second mold insert part has a second mold side wall, wherein the first and second mold side walls are embodied such that in the molding position they transition essentially seamlessly into one another.

6. The thermoforming tool according to claim 5, wherein the second mold side wall is axially movable by a predetermined amount relative to the first mold side wall.

7. The thermoforming tool according to claim 1, wherein the first mold insert part and/or the second mold insert part have an undercut extending circumferentially.

8. The thermoforming tool according to claim 1, wherein the second mold insert part has a rounded axial end facing away from the first mold insert part.

9. The thermoforming tool according to claim 1, further comprising an actuating device that is embodied to selectively displace the second mold insert part back and forth between the molding position and the demolding position.

10. The molding thermoforming tool according to claim 9, wherein the actuating device is further embodied to displace the mold bottom back and forth between the molding position and the demolding position, synchronously or asynchronously with the second mold insert part.

11. The thermoforming tool according to claim 1, further comprising an electing device coupled to the mold bottom and embodied to displace the mold bottom further in the direction of the cavity after the container has been demolded in order to eject the container.

12. The thermoforming tool according to claim 11, wherein the electing device is further embodied to return the mold bottom to its starting position, wherein the second mold insert part is moved from the demolding position to the molding position using the return movement of the mold bottom.

13. The thermoforming tool according to claim 1, wherein the mold insert and the mold bottom are part of a lower tool part, and wherein the molding tool further has an upper tool part cooperating with the lower tool part.

14. A thermoforming machine, comprising the thermoforming tool according to claim 1.

15. A method for producing a container from a two-dimensional web of material with tool of claim 1, wherein the method comprises the following steps:

positioning the second mold insert part and the mold bottom of the thermoforming tool in a molding position in order to permit molding of the container;

molding the container in that a two-dimensional web of material is molded in the cavity of the molding tool until said web of material is positioned against the mold bottom and a mold side wall of the cavity defined by the first and second mold insert parts; and, axially moving the mold bottom and the second mold insert part relative to the first mold insert part in order to demold the container in the cavity.

16. The method according to claim 15, wherein the mold bottom and the second mold insert part are moved axially by a predetermined amount, synchronously or asynchronously with one other, in order to demold the container.

17. The method according to claim 16, wherein after the demolding position is attained, the mold bottom is moved further towards the cavity in order to eject the demolded container.

* * * * *